US006962654B2

(12) United States Patent
Arnaud

(10) Patent No.: US 6,962,654 B2
(45) Date of Patent: Nov. 8, 2005

(54) METHODS AND APPARATUS FOR SUPPLYING HIGH CONCENTRATIONS OF DISSOLVED OXYGEN AND OZONE FOR CHEMICAL AND BIOLOGICAL PROCESSES

(75) Inventor: Johnny Arnaud, Houston, TX (US)

(73) Assignee: Hydrotreat, Inc., Houston, TX (US)

( * ) Notice: Subject to any disclaimer, the term of this patent is extended or adjusted under 35 U.S.C. 154(b) by 0 days.

(21) Appl. No.: 10/317,021

(22) Filed: Dec. 11, 2002

(65) Prior Publication Data

US 2003/0173276 A1  Sep. 18, 2003

Related U.S. Application Data

(63) Continuation-in-part of application No. 09/879,496, filed on Jun. 12, 2001, now Pat. No. 6,669,843.

(51) Int. Cl.[7] .................... B01D 17/12; B01D 53/047
(52) U.S. Cl. .................... 210/143; 210/150; 210/151; 210/188; 210/192; 210/198.1; 210/206; 210/218; 210/220; 210/221.2; 210/258; 210/760; 95/8; 95/19; 96/109; 96/111; 96/113; 96/130; 261/53; 261/76; 261/77; 261/93; 366/165.5; 366/173.2; 366/177.1
(58) Field of Search .................... 210/143, 150, 210/151, 188, 192, 198.1, 206, 218, 220, 210/221.2, 258, 758, 760, 808; 95/8, 11, 95/12, 19, 30; 261/53, 76, 77, 93, 115, DIG. 54; 366/165.5, 172.2, 177.1, 173.2; 96/109, 111, 96/113, 130

(56) References Cited

U.S. PATENT DOCUMENTS

| 2,735,547 A | 2/1956 | Vissac ................ 209/211 |
|---|---|---|
| 3,289,608 A | 12/1966 | Lavat, Jr. ................ 103/220 |
| 3,447,511 A | 6/1969 | Beard et al. ................ 123/3 |
| 3,507,397 A | 4/1970 | Robinson ................ 210/512 |
| 3,512,651 A | 5/1970 | Laval, Jr. ................ 210/512 |
| 3,568,837 A | 3/1971 | Laval, Jr. ................ 210/136 |
| 3,947,364 A | 3/1976 | Laval, Jr. ................ 210/512 |
| 4,237,006 A | 12/1980 | Colman et al. ................ 210/84 |
| 4,725,293 A * | 2/1988 | Gunderson ................ 96/130 |
| 4,765,804 A * | 8/1988 | Lloyd-Williams et al. .... 96/130 |
| 4,790,942 A | 12/1988 | Shmidt et al. ................ 210/650 |
| 5,000,848 A | 3/1991 | Hodgins et al. ....... 210/321.68 |
| 5,021,165 A | 6/1991 | Kalnins ................ 210/703 |
| 5,071,542 A | 12/1991 | Tuszko et al. ................ 209/144 |
| 5,131,757 A | 7/1992 | Smith ................ 366/165 |
| 5,275,742 A * | 1/1994 | Satchell et al. ................ 210/760 |
| 5,362,395 A | 11/1994 | Dorau et al. ................ 210/638 |
| 5,451,349 A | 9/1995 | Kingsley ................ 261/91 |

(Continued)

FOREIGN PATENT DOCUMENTS

EP  0 250 235 A1 * 12/1987

OTHER PUBLICATIONS

"Fundamentals of *General Chemistry*", C. H. Sorum, University of Wisconsin, undated.

(Continued)

*Primary Examiner*—David A. Reifsnyder

(74) *Attorney, Agent, or Firm*—Howrey LLP

(57) ABSTRACT

A method and apparatus for supplying dissolved gases (such as oxygen, ozone, chlorine etc.) for chemical and biological processes is described. The methods and apparatus described are particularly suitable for use in the biodegradation of organic matter (such as in municipal and industrial wastewater treatment), and other uses. The apparatus may comprise a dissolved gas supply system.

26 Claims, 9 Drawing Sheets

U.S. PATENT DOCUMENTS

| | | | | |
|---|---|---|---|---|
| 5,478,484 | A | 12/1995 | Michaluk | 210/788 |
| 5,647,977 | A | 7/1997 | Arnaud | 210/167 |
| 5,794,791 | A | 8/1998 | Kindig | 209/727 |
| 5,882,530 | A | 3/1999 | Chase | 210/788 |
| 5,944,998 | A | 8/1999 | Rolchigo et al. | 210/654 |
| 5,989,313 | A * | 11/1999 | Mize | 95/11 |
| 6,024,874 | A | 2/2000 | Lott | 210/512.1 |
| 6,032,931 | A | 3/2000 | Plunkett | 261/77 |
| 6,080,317 | A | 6/2000 | Wagner et al. | 210/652 |
| 6,106,713 | A | 8/2000 | Miller et al. | 210/321.63 |
| 6,165,365 | A | 12/2000 | Salyer et al. | 210/650 |
| 6,168,724 | B1 | 1/2001 | Hurwitz | 210/780 |
| 6,561,497 | B2 * | 5/2003 | Newman | 261/76 |
| 2003/0168211 | A1 | 9/2003 | Arnaud | 166/68 |
| 2003/0173275 | A1 | 9/2003 | Arnaud | 210/143 |
| 2003/0173288 | A1 | 9/2003 | Arnaud | 210/512 |
| 2004/0031742 | A1 | 2/2004 | Arnaud | 210/259 |

OTHER PUBLICATIONS

"Chemical Calculations An Introduction to the Use of Mathematics in Chemistry", Sidney W. Benson, University of Southern California, undated.

"Fluid Mechanics With Engineering Applications", R. L. Daugherty, California Institute of Technology, 1954.

"Equipment and Applications For Industry", Claude Laval Corporation, undated.

"Industrial Process Problem Solving . . . Solids/Liquids and Liquid/Liquid Hydrocyclones for Separation, Classification, and Dewatering", © 1995 Krebs Engineers.

DEMCO Cyclone Separators Catalog C1-78, Aug. 15, 1978.

Geosource® The Pioneer in solids/liquid separation, 1979 Catalog.

Hydrocyclones Problem Solving in Liquid/Solids Separation, Picenso International Inc., undated.

"Facts about liquid cyclones. Where to use them. Where not to use them. And how to specify the right cyclone for the job. With special emphasis on the DORRCLONE®"; © 1979 Dorr-Oliver Incorporated.

"Porous Plastics" POREX®, © 1998 Porex Technologies Corp.

"Nitroxy Siliporite® Molecular Sieves for Medical Oxygen Concentrations" CESA, no date.

"New Trends In Air Separation Adsorbents" by Marie-Theres Granmougin, et al.; CECA, France, undated.

"Clarifying Oilfield and Refinery Waste Waters by Flotation:" Journal of Petroleum Technology, pp. 426-430, dated Apr. 1973.

"Membrane Bioreactors for Wastewater Treatment:" by Tom Stephenson, et al.; dated 2000, reprinted 2001.

"New Developments in High Shear Crossflow Membrane Filtration:" Fluid/Particle Separation Journal. pp. 123-138, vol. 4, No. 1, Mar. 1991.

"The Application of Demulsification Chemicals in Recycling, Recovery and Disposal of Oily Waters;" Sam Delchad, Ph. D., Emulsions Control Inc. California, no date.

EPA Technical Bulletin, EPA 456/F-99-006R; "Nitrogen Oxides (NOx). Why and How They Are Controlled;" Nov. 1999.

"Superior Nitrate Removal for Treatment Plants and the Home;" Sybron Chemicals Inc.; IONIC® SR-7 Advanced Anion Exchange Resin, undated.

Solicitation for Financial Assistance Applications No. DE-PS26-02NT41613: "Developement of Technologies and Capabilities for Developing Coal, Oil and Gas Energy Resources;" p. 55. "3. Gas Flooding", undated.

International Search Report mailed May 6, 2004 (PCT/US03/39325).

* cited by examiner

METHODS AND APPARATUS FOR SUPPLYING HIGH CONCENTRATIONS OF DISSOLVED OXYGEN AND OZONE FOR CHEMICAL AND BIOLOGICAL PROCESSES

CROSS REFERENCE TO RELATED APPLICATIONS

This application is a continuation-in-part of patent application Ser. No. 09/879,496, filed Jun. 12, 2001, entitled "Method and Apparatus for Mixing Fluids, Separating Fluids, and Separating Solids from Fluids," by Johnny Arnaud, which is hereby incorporated by reference in its entirety, issued on Dec. 30, 2003 as U.S. Pat. No. 6,669,843.

BACKGROUND OF THE INVENTION

1. Field of the Invention

The present invention relates to methods and apparatus for supplying dissolved gases (such as oxygen, ozone, chlorine, etc.) for chemical and biological processes. The methods and apparatus of the present invention are particularly suitable for use in the biodegradation of organic matter (such as in municipal and industrial wastewater treatment), the oxidation and precipitation of dissolved metals, the oxidation and destruction of dissolved organic contaminants in wastewater, the farming of aquatic species (such as fish and shrimp), the control of odors (such as those caused by anaerobic bacteria in contaminated wastewater or sludge), and the killing of bacteria in potable water and in water to be discharged into public streams.

2. Description of Related Art

Municipal wastewater treatment plants may require aeration of the wastewater under treatment for the entire duration of the biological treatment process, consuming large amounts of dissolved oxygen. The oxygen is typically introduced into the process by bubbling air through the wastewater under treatment with a small percentage of oxygen actually being dissolved or transferred to the liquid state and available to the mass of microorganism in performing its function. The aeration or oxygen transfer efficiency at its best is very low with the aeration process perhaps consuming as much as 50 to 90 percent (50% to 90%) of the total energy costs of a typical municipal treatment facility.

The control of the aeration process is typically based on the amount of excess dissolved oxygen over what was consumed in the biodegradation process that is left in the wastewater to be discharged to public streams after treatment. When the excess dissolved oxygen reaches a predetermined low level in the treated wastewater to be discharge, additional air is bubbled through the wastewater under treatment until the dissolved oxygen is again within an acceptable range in the treated wastewater to be discharged from the process and presumed to be sufficient in the treatment process.

A certain amount of excess oxygen is desirable as protection against any temporary increase in oxygen demand. However, any amount of excess oxygen taken out of the process with the wastewater that has completed treatment adds significantly to the costs of the treatment process because of the low oxygen transfer efficiency in the aeration process. Because of the high-energy costs of aeration, the amount of dissolved oxygen may be maintained at levels below what might be used for optimum biodegradation processes.

In reviewing any process requiring oxygen dissolved in a liquid, like in water or wastewater, the primary issue soon becomes the high costs of energy associated with the inefficiency of transferring the oxygen to a dissolved state in the water to be available for the process.

With the present state of technology available, the costs are minimized by maintaining the minimum amount of dissolved oxygen in the process needed to perform the biological destruction of contaminants, keeping the contaminated wastewater in the treating process for a minimum amount of time, and keeping the excess oxygen allowed to be discharged with the treated wastewater at a minimum, again because of the high costs of energy associated with dissolving oxygen in the wastewater related to the low oxygen transfer efficiency.

In addition to supplying dissolved oxygen from biological processes, oxygen ($O_2$) from air, pure oxygen ($O_2$), ozone ($O_3$), chlorine ($Cl_2$), hydrogen peroxide ($H_2O_2$), and potassium permanganate ($KMnO_2$) are examples of the oxidants available for treating wastewater and react directly in chemical oxidation-reduction reactions with many contaminants so they can be removed in order to comply with the regulatory requirements for discharge of the water into streams or prevent discharge of the volatile contaminants into the atmosphere. The oxidants can also be used to remove contaminants as bacteria, iron, hydrogen sulfide, manganese, pesticides, and others from water to make it potable. In order to perform their function the oxidants must first be dissolved in the water or wastewater in which the chemical oxidation-reduction reactions are to occur. The same low efficiencies of bubbling air through the water or wastewater are realized in many direct chemical oxidation-reduction reactions as they are in biological degradation processes.

With respect to the present invention, the methods and apparatus will, for convenience, be discussed in terms of supplying dissolved oxygen and ozone for use in the treatment of contaminated water and wastewater to support biological and chemical oxidation-reduction reaction processes. It should be clearly understood, however, that the methods and apparatus of the present invention might be used in the treatment of many other fluid solutions with either oxidizing or reducing agents regardless of their intended use or how they become contaminated.

An apparatus and method capable of dissolving oxygen with a much higher efficiency than currently available, if generally applied, may greatly reduce the energy consumption of the United States and other nations in their sewage treatment plants. The present invention overcomes the deficiencies of previous methods and apparatus by dissolving high concentrations of oxygen, and other gases, in an enclosed and pressurized apparatus exposing the mass of microorganisms and contaminants to the high level of dissolved oxygen inside the apparatus and then injecting the fluid concentrated with oxygen into the general treating process and exposing the rest of the mass of microorganisms and contaminants to higher oxygen levels than what is capable of being reached by bubbling air through the treating process based on Henry's Law.

Also, a second embodiment of the apparatus of the present invention is capable of dissolving all oxygen gases into the fluid (such as water and wastewater) without discharging any to the atmosphere, making it economically feasible to use technically pure oxygen separated from air to increase the concentration of oxygen even further to a level in excess of four times the level that can be reached by using air that is only approximately twenty percent (20%) oxygen. The use of technically pure oxygen allows the reduction of the size of the apparatus to approximately one-fourth of the size required for dissolved air with twenty percent oxygen with an associated reduction in energy consumption.

SUMMARY OF INVENTION

The present invention provides a new and improved method and apparatus for dissolving gases into liquids for aeration in biological processes for biodegradation of organic wastewater contamination, for introduction of gaseous oxidants (oxygen from air, pure oxygen, ozone, chlorine, etc.) into chemical oxidation-reduction processes, for supplying chlorine or ozone in the purification of potable water, and for supplying oxygen to aquatic species as fish and shrimp by saturating a stream of the liquid in an enclosed and pressurized fluid mixer and injecting the saturated liquid into the treating process in accordance with the present invention.

An apparatus in accordance with the present invention employed as a high concentration dissolved oxygen supply may generally include a compressor with a pressure tank to draw air from the atmosphere and increase its pressure to that required for system operation, a pressure swing adsorption (PSA) system employing two tanks with a molecular sieve media in the form of beads to selectively remove the nitrogen from the atmospheric air by adsorption to concentrate the oxygen for dissolving into water, a fluid mixing system to draw water from a treating process and dissolve the concentrated oxygen into the water to saturation levels in an enclosed and pressurized fluid mixer applied as a dissolved gas generator and release any excess oxygen in the mixer back to the atmosphere, and a control system to monitor and control the process. When the molecular sieve media in one tank is exhausted the incoming air is switched to flow through the second media tank and the pressure in the first tank is reduced to release the nitrogen adsorbed onto its media to the atmosphere.

A second embodiment of the present invention employed as a high concentration dissolved oxygen supply may generally include a vacuum pressure swing adsorption (VPSA) system with a low-pressure blower to draw air from the atmosphere and drive the low-pressure air through the molecular sieve media and place the concentrated oxygen in a low-pressure tank downstream for further processing and a vacuum pump to create a vacuum in the tank when the molecular sieve media is exhausted to dislodge the nitrogen adsorbed onto the media and discharge it to the atmosphere, a smaller (approximately one-fifth size) compressor with a high-pressure tank to draw the concentrated oxygen from the low-pressure tank and increase its pressure to that required for system operation, a fluid mixing system to draw water from a treating process and dissolve the concentrated oxygen into the water to saturation levels in an enclosed and pressurized fluid mixer applied as a dissolved gas generator and return any excess-oxygen in the mixer back to the low-pressure oxygen tank for recycling and 100 percent oxygen usage, and a control system to monitor and control the process. When the molecular sieve media in one tank is exhausted the incoming air is switched to flow through the second media tank and the pressure in the first tank is reduced by a vacuum pump to release the nitrogen adsorbed onto its media and discharge it to the atmosphere.

A third embodiment of the present invention employed as a high concentration dissolved ozone supply may generally include a vacuum pressure swing adsorption (VPSA) system with a low-pressure blower to draw air from the atmosphere and drive the low-pressure air through the molecular sieve media and place the concentrated oxygen in a low-pressure tank downstream for further processing and a vacuum pump to create a vacuum in the tank when the molecular sieve media is exhausted to dislodge the nitrogen adsorbed onto the media and discharge it to the atmosphere, a smaller (approximately one-fifth size) compressor with a high-pressure tank to draw the concentrated oxygen from the low-pressure tank and increase its pressure to that required for system operation, an oxygen gas cooler to decrease the oxygen gas temperature, an ozone generator to convert part of the concentrated oxygen to ozone for dissolving, a fluid mixing system to draw water from a treating process and dissolve the concentrated ozone-oxygen gases into the water to saturation levels in an enclosed and pressurized fluid mixer applied as a dissolved gas generator and return any excess ozone-oxygen gases in the mixer back to the low-pressure oxygen tank for recycling and 100 percent oxygen usage, and a control system to monitor and control the process. When the molecular sieve media in one tank is exhausted the incoming air is switched to flow through the second media tank and the pressure in the first tank is reduced by a vacuum pump to release the nitrogen adsorbed onto its media and discharge it to the atmosphere.

A fourth embodiment of the present invention employed as a high concentration dissolved oxygen supply may generally include a vacuum pressure swing adsorption (VPSA) system with a low-pressure blower to draw air from the atmosphere and drive the low-pressure air through the molecular sieve media and place the concentrated oxygen in a low-pressure tank downstream for further processing and a vacuum pump to create a vacuum in the tank when the molecular sieve media is exhausted to dislodge the nitrogen adsorbed onto the media and discharge it to the atmosphere, a fluid mixing system to draw water from a treating process and dissolve the concentrated oxygen gas into the water to saturation levels in an enclosed and pressurized fluid mixer applied as a dissolved gas generator with a built in venturi to create a suction and draw in the concentrated oxygen gas for dissolving and return any excess oxygen gases in the mixer back to the low-pressure oxygen tank for recycling and 100 percent oxygen usage, and a control system to monitor and control the process. When the molecular sieve media in one tank is exhausted the incoming air is switched to flow through the second media tank and the pressure in the first tank is reduced by a vacuum pump to release the nitrogen adsorbed onto its media and discharge it to the atmosphere.

A fifth embodiment of the present invention employed as a high concentration dissolved oxygen (or chlorine) supply may generally include a high pressure oxygen (or chlorine) supply tank with a low pressure storage tank, a fluid mixing system to draw water from a treating process and dissolve the concentrated oxygen gas into the water to saturation level in an enclosed and pressurized fluid mixer applied as a dissolved gas generator with a built in venturi to create a suction and draw in the concentrated oxygen gas for dissolving and return any excess oxygen gases in the mixer back to the low-pressure oxygen tank for recycling and 100 percent oxygen usage, and a control system to monitor and control the process.

BRIEF DESCRIPTION OF DRAWINGS

FIG. 6 illustrates the horizontal flow of the liquid as it enters the fluid mixer and flows through the radial-grooved ring. FIG. 7 illustrates the horizontal flow of the fluid as it enters the fluid mixer and flows through the radial-grooved ring with an orifice ring positioned with the orifice ports over each groove in order to inject a gas into each stream. FIG. 8 is a fluid flow diagram illustrating the vertical flow of fluid through the components of the fluid mixer.

DESCRIPTION OF ILLUSTRATIVE EMBODIMENTS

Illustrative embodiments of the invention are described below as they might be employed in supplying dissolved oxygen or ozone for use in biological and chemical processes. In the interest of clarity, not all features of an implementation are described in this specification. It will of course by appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 1:
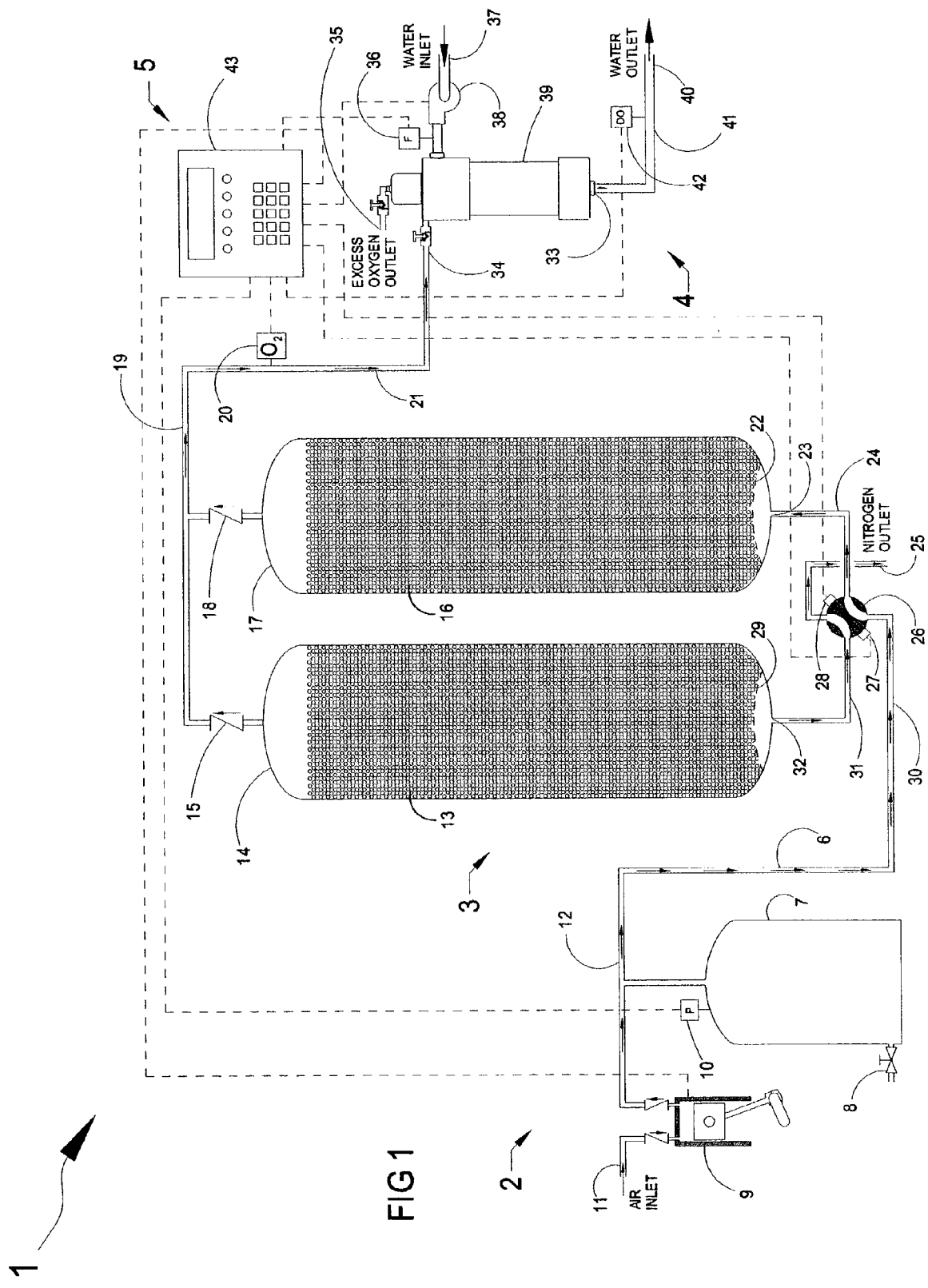
FIG. 1 depicts a schematic representation of a dissolved gas supply system for supplying concentrated dissolved oxygen to biological and chemical water treating processes identifying major system components, and illustrating the flow pattern through a pressure swing adsorption system to extract oxygen from compressed atmospheric air for dissolving in a fluid mixer with excess oxygen being discharged from the fluid mixer to the atmosphere.

FIG. 1 depicts in a schematic illustration an exemplary dissolved gas supply system 1 for supplying high concentrations of dissolved oxygen to biological and chemical oxidation-reduction processes in accordance with the present invention. The dissolved gas supply system 1 consists of an air supply system 2 to supply air from the atmosphere at the pressure level required by the system into which the dissolved oxygen is to be used; a pressure swing adsorption (PSA) system 3 to remove the nitrogen from the atmospheric air and furnish concentrated oxygen for dissolving into the water (or wastewater); an oxygen dissolving system 4 to dissolve the concentrated oxygen into the water drawn from the water treating process; and a control system 5 to monitor, time, and sequence system operation; and associated piping.

The air supply system 2 consists of an air compressor 9, a pressure tank 7, and associated piping. The pressure swing adsorption (PSA) system 3 consists of two media tanks 14 and 17 containing molecular sieve media 13 and 16 respectively for separating nitrogen from air and allowing the oxygen to flow through, checkvalves 15 and 18 in the outlet of the media tanks 14 and 17 respectively, a four-way pilot operated air control valve 26 to alternate the media tank operation, and associated piping. The oxygen allowed to flow through the media 13 and 16 may be from 90 percent pure and upward for non-human applications, to virtually 100 percent for medical applications. The purity depends on the media and the processing it is subjected to during manufacturing.

The oxygen dissolving system 4 consists of a pump 38 to draw water from the treating process (not shown) and a fluid mixer applied as a dissolved gas generator 39 to dissolve air into the water. The fluid mixer applied as a dissolved gas generator 39 in further described in a following discussion of the drawings in FIGS. 6–8.

The control system 5 consists of a microprocessor controller 43, an air pressure sensor 10, an oxygen gas sensor 20, a water flow sensor 36, and a dissolved oxygen sensor 42.

In operation, atmospheric air is drawn into the system through inlet 11 by the air compressor 9 where its pressure is increased to system operating pressure. The air flows from the compressor 9, fills the pressure tank 7 where the pressure is monitored by pressure sensor 10 and recorded by the controller 43. The controller 43 shuts down the compressor when the air pressure in the pressure tank 7 reaches a level preset in the controller 43. The pressurized air flows from the pressure tank 7 through piping 12, 6, and 30 into the air control valve 26. The air control valve 26 directs the air under pressure into the media tank 17 through the bottom inlet 23.

The air control valve 26 also opens the media tank 14 to vent to the atmosphere to remove the gas pressure in the tank 14 and dump the nitrogen adsorbed into the media 13 to the atmosphere.

The pressurized air entering the media tank 17 through the inlet 23 flows up through a bottom distributor 22 and up through the media 16 in media tank 17 where the nitrogen is adsorbed onto the media 16. The oxygen gas exits the media tank 17 through checkvalve 18 and flows through piping 19 and 21 where the level of the oxygen gas concentration is monitored by an oxygen gas sensor 20 and recorded by the controller 43.

The oxygen gas flows from piping 21 into the dissolved gas generator 39 and is dissolved into the water from the treating process. The water is drawn from the treating system (not shown) through the water inlet 37 by pump 38. The water flows from pump 38 under pressure into the dissolved gas generator 39 and becomes saturated with dissolved oxygen.

The water flowrate and volume are monitored by the flow sensor 36 and recorded by the controller 43. The saturated water exits through outlet port 33 in the bottom of the dissolved gas generator 39, flows through piping 41 where the dissolved oxygen concentration is monitored by sensor 42 and recorded by the controller 43, and exits the system through the water outlet 40. Excess oxygen not dissolved in the fluid mixer 39 is released to the atmosphere through outlet 35.

When the controller 43 detects a drop in the concentration of the oxygen gas at the sensor 20, the controller 43 switches the air control valve 26 to redirect the airflow through media tank 14 and releases the pressure on media tank 17 to dump the nitrogen adsorbed on the media 16 to atmosphere. From the water volume flowing through the dissolved gas system 1 and the amount of dissolved oxygen in the water recorded in the controller 43, the controller 43 can also indicate the amount of dissolved oxygen delivered to the treating process. The dissolved gas supply system 1 can be sized by operating pressure and flowrate to deliver any quantity of dissolved oxygen required by a treating process.

For example, according to Henry's Law, the maximum solubility of pure oxygen in water at 60-psi (pounds per square inch) pressure and 60 degrees Fahrenheit is theatrically approximately 157.5 mg/l (milligrams per liter). As an example, the dissolved gas supply system 1 operating at 1,000 gpm (gallons per minute) and 60-psi pressure could theoretically deliver approximately 78.7 pounds of dissolved oxygen per hour to a treating process. For a second example, the dissolved gas supply system 1 operating at 1,000 gpm (gallons per minute) and 60-psi pressure with 90 percent saturation and 90 percent pure oxygen could theoretically deliver approximately 63.6 pounds of dissolved oxygen per hour to a treating process. For a third example, the dissolved gas supply system 1 operating at 1,000 gpm (gallons per minute) and 80-psi pressure with 90 percent saturation and 90 percent pure oxygen could theoretically deliver approximately 89.2 pounds of dissolved oxygen per hour to a treating process.

Figure 2:
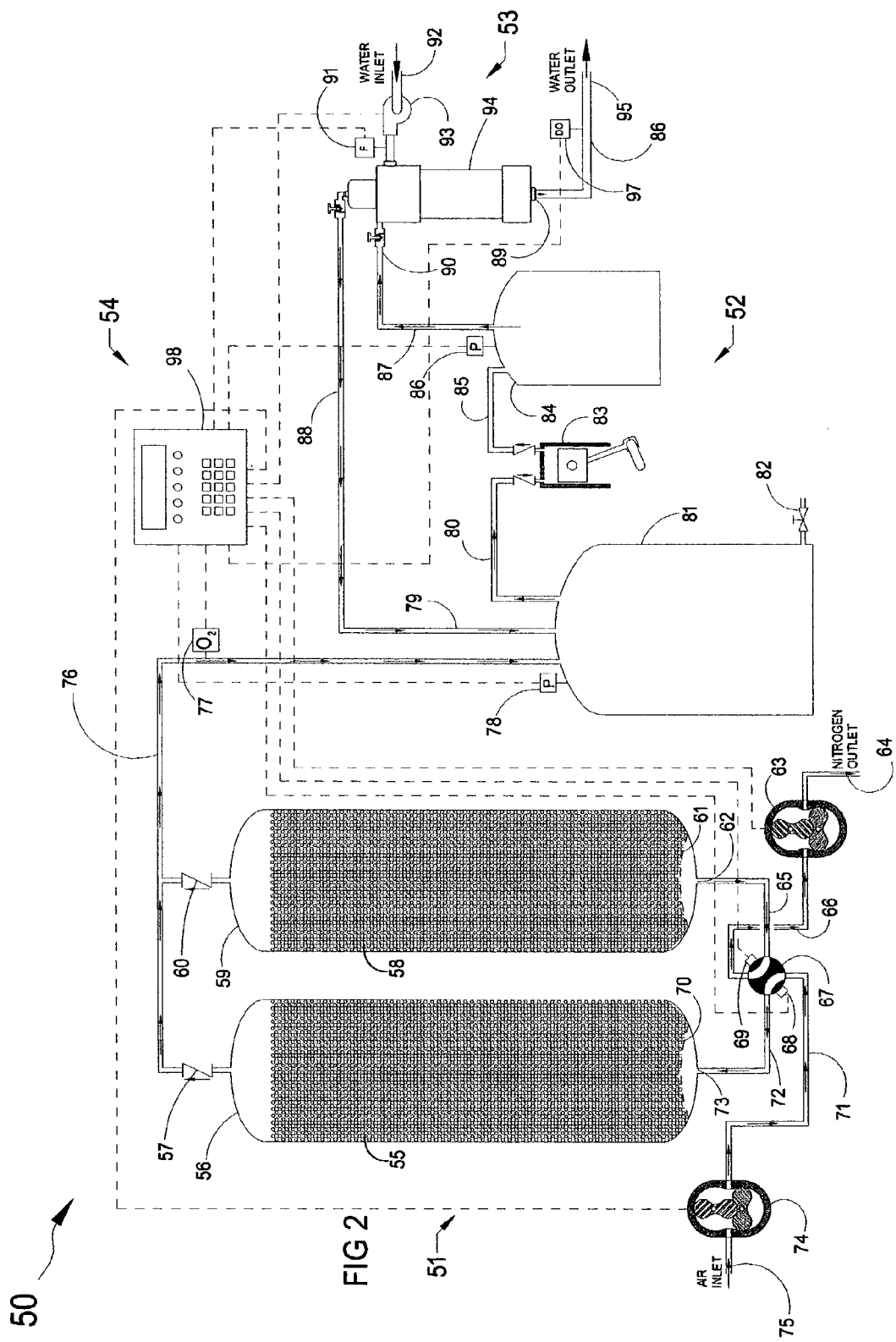
FIG. 2 depicts a schematic representation of a second embodiment of a dissolved gas supply system for supplying concentrated dissolved oxygen to biological and chemical water treating processes identifying major system components and illustrating the flow pattern of low pressure air through a vacuum pressure swing adsorption system to extract oxygen from atmospheric air and compressing the oxygen for dissolving in a fluid mixer with excess oxygen being recycled for 100 percent concentrated oxygen usage.

FIG. 2 depicts in a schematic illustration a second embodiment of an exemplary dissolved gas supply system 50 for supplying high concentrations of dissolved oxygen to biological and chemical oxidation-reduction processes in accordance with the present invention. The dissolved oxygen supply system 50 consists of a vacuum pressure swing adsorption (VPSA) system 51 to remove the nitrogen from the atmospheric air and furnish concentrated oxygen for dissolving into the water (or wastewater); an oxygen pressurized system 52 to supply oxygen at the pressure level required by the system into which the dissolved oxygen is to be used; an oxygen dissolving system 53 to dissolved the oxygen into the water drawn from the water treating process; and a control system 54 to monitor, time, and sequence system operation; and associated piping.

The vacuum pressure swing adsorption (VPSA) system 51 consists of two media tanks 56 and 59 containing molecular sieve media 55 and 58 respectively for separating nitrogen from air and allowing the oxygen to flow through, checkvalves 57 and 60 in the outlet of the media tanks 56 and 59 respectively, a four-way pilot operated air control valve 67 to alternate the media tank operation, a low pressure blower 74 or air pump to draw air from the atmosphere and drive it through the media tanks 56 and 59, a vacuum pump 63 to create a vacuum in the media tanks 56 and 59 and draw the nitrogen from the media 55 and 58 and discharge it to the atmosphere, a low-pressure tank 81, and associated piping.

The oxygen that is allowed to flow through the media 55 and 58 may be from 90 percent pure and upward for non-human applications to virtually 100 percent for medical applications. The purity depends on the media and the processing it is subjected to during manufacturing. The oxygen dissolving system 53 consists of pump 93 to draw water from the treating process (not shown) and a fluid mixer applied as a dissolved gas generator 94 to dissolve the air into the water. The fluid mixer applied as a dissolved gas generator 94 is further described in a following discussion of the drawings in FIGS. 6–8.

The control system 54 consists of a microprocessor controller 98, an oxygen pressure sensor 78, a compressed oxygen pressure sensor 86, an oxygen gas concentration sensor 77, a water flow sensor 91, and a dissolved oxygen sensor 97. In operation, low-pressure blower 74 draws air from the atmosphere into the system through air inlet 75 where its pressure is increased to the level (typically below 20 psig) required to flow through the media 55 and 58 and overcome system pressure drops.

The air flows from the blower 74 through piping 71, through the air control valve 67 and is directed through piping 72 into the media tank 56 through the bottom inlet port 73. The pressurized air entering media tank 56 through the inlet 73 flows up through a bottom distributor 70 and up through the media 55 in media tank 56 where nitrogen is adsorbed onto the media 55. The oxygen gas exits the media tank 56 through checkvalve 57 and flows through piping 76 where the level of the oxygen gas concentration is monitored by an oxygen gas sensor 77 and recorded by the controller 98.

The oxygen gas flows from piping 76 into the low-pressure tank 81 where the pressure is monitored by pressure sensor 78 and recorded by the controller 98. The controller 98 shuts down the blower 74 when the air pressure in the low-pressure tank 81 reaches a level preset in the controller 98. The low-pressure oxygen flows out of low-pressure tank 81 through piping 80 and into the compressor 83 where oxygen pressure is increased oxygen the level to be dissolved into the water from the treating process. The high-pressure oxygen flows out of the compressor 83 through piping 85 and into high-pressure tank 84 where the oxygen pressure is monitored by pressure sensor 86 and recorded by controller 98.

The controller 98 shuts down the compressor 83 when the oxygen pressure in the high-pressure tank 84 reaches a level preset in the controller 98. The high-pressure oxygen flows out of the high-pressure tank 84 through piping 87 and into the dissolved gas generator 94 to be dissolved into the water from the treating process. The water is drawn from the treating system (not shown) through the water inlet 92 by pump 93.

The water flows from pump 93 under pressure into the dissolved gas generator 94 and becomes saturated with dissolved oxygen. The water flowrate and volume is monitored by the flow sensor 91 and recorded by the controller 98. The saturated water exits through outlet port 89 in the bottom of the dissolved gas generator 94, flows through piping 86 where the dissolved oxygen concentration is monitored by sensor 97 and recorded by the controller 98, and exits the system through the water outlet 95. Excess oxygen not dissolved in the fluid mixer 94 is returned to the low-pressure tank 81 through piping 88 and 79 to be recycled for 100 percent concentrated oxygen usage.

When the controller 98 detects a drop in the concentration of the oxygen gas by sensor 77, the controller 98 switches the air control valve 67 to redirect the incoming airflow through media tank 59 and releases the pressure on media tank 56 and starts the vacuum pump 63 to dump the nitrogen adsorbed on the media 55 to atmosphere. The vacuum pump is operated for the length of time preset in the controller 98 and then shuts down. From the water volume flowing through the dissolved oxygen system and the amount of dissolved oxygen in the water recorded in the controller 98, the controller 98 can also indicate the amount of dissolved oxygen delivered to the treating process. The dissolved gas supply system 50 can also be sized in pressure and flowrate to deliver any quantity of dissolved oxygen required by a treating process.

Figure 3:
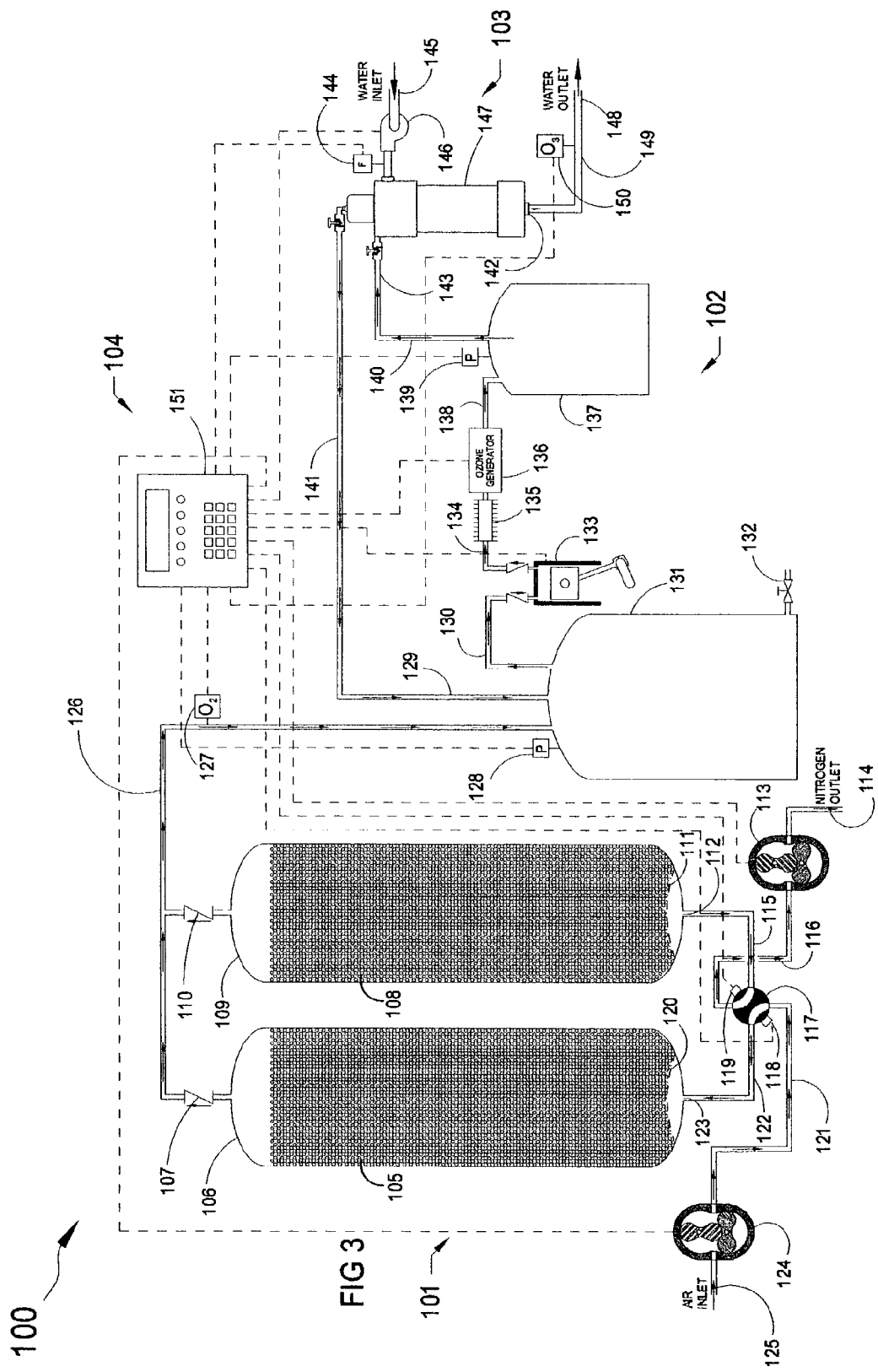
FIG. 3 depicts a schematic representation of a third embodiment of a dissolved gas supply system for supplying concentrated dissolved ozone to biological and chemical water treating processes identifying major system components and illustrating the flow pattern of low pressure air through a vacuum pressure swing adsorption system to extract oxygen from atmospheric air and compressing the oxygen for generating ozone for dissolving in a fluid mixer with excess oxygen being recycled for 100 percent concentrated oxygen usage.

FIG. 3 depicts in a schematic illustration a third embodiment of an exemplary dissolved gas supply system 100 for supplying high concentrations of dissolved ozone to biological and chemical oxidation-reduction processes in accordance with the present invention. The dissolved gas supply system 100 consists of a vacuum pressure swing adsorption (VPSA) system 101 to remove the nitrogen from the atmospheric air and furnish concentrated oxygen to produce ozone for dissolving into the water (or wastewater); an oxygen pressurization and ozone generation system 102 to supply ozone at the pressure level required by the system into which the dissolved ozone is to be used; an ozone dissolving system 103 to dissolve the ozone into the water drawn from the water treating process; and a control system 104 to monitor, time, and sequence system operation; and associated piping.

The vacuum pressure swing adsorption (VPSA) system 101 consists of two media tanks 106 and 109 containing molecular sieve media 105 and 108 respectively for separating nitrogen from air and allowing the oxygen to flow through, checkvalves 107 and 110 in the outlet of the media tanks 106 and 109 respectively, a four-way pilot operated air control valve 117 to alternate the media tank operation, a low pressure blower 124 or air pump to draw air from the atmosphere and drive it through the media tanks 106 and 109, a vacuum pump 113 to create a vacuum in the media tanks 106 and 109 and draw the nitrogen from the media 105 and 108 and discharge it to the atmosphere, and associated piping.

The oxygen that is allowed to flow through the media 105 and 108 may be from 90 percent pure and upward for non-human applications to virtually 100 percent for medical applications. The purity depends on the media and the processing it is subjected to during manufacturing.

The ozone dissolving system 103 consists of pump 146 to draw water from the treating process (not shown) and a fluid mixer applied as a dissolved gas generator 147 to dissolve the oxygen and ozone gases into the water. The fluid mixer applied as a dissolved gas generator 147 is further described in a following discussion of the drawings in FIGS. 9–11. The control system 104 consists of a microprocessor controller 151, an oxygen pressure sensor 128, a compressed oxygen-ozone pressure sensor 139, an oxygen gas concentration sensor 127, a water flow sensor 144, and a dissolved ozone sensor 150.

In operation, the blower 124 draws atmospheric air into the system through air inlet 125 where its pressure is increased to the level (typically below 20 psig) required to flow through the media 105 and 108 and overcome system pressure drops. The air flows from the blower 124 through piping 121, through the air control valve 117 and is directed through piping 122 into the media tank 106 through the bottom inlet port 123. The pressurized air entering media tank 106 through the inlet 123 flows up through a bottom distributor 120 and up through the media 105 in media tank 106 where the nitrogen is absorbed onto the media 105.

The oxygen gas exits the media tank 106 through checkvalve 107 and flows through piping 126 where the level of the oxygen gas concentration is monitored by an oxygen gas sensor 127 and recorded by the controller 151. The oxygen gas flows from piping 126 into the low-pressure tank 131 where the pressure is monitored by pressure sensor 128 and recorded by the controller 151. The controller shuts down the blower 124 when the air pressure in the low-pressure tank 131 reaches a level preset in the controller 151.

The low-pressure oxygen flows out of low-pressure tank 131 through piping 130 and into the compressor 133 where oxygen pressure is increased to the level to be dissolved into the water from the treating process. The high-pressure oxygen flows out of the compressor 133 through piping 134 and into the gas cooler 135. The oxygen gas is cooler before entering the ozone generator 136 to atmosphere temperature because of the detrimental effect higher temperatures have on ozone.

The cooled oxygen flows out of the gas cooler 135 and into the ozone generator 136 where a percentage of the oxygen is converted to ozone. By using high concentration oxygen in the ozone generator 136, the amount of ozone produced is much higher than when air is used as the source of oxygen to generate the ozone. The oxygen-ozone gas mixture flows out of the ozone generator through piping 138 and into the high-pressure tank 137 where the oxygen-ozone gas pressure is monitored by pressure sensor 139 and recorded by controller 151.

The controller 151 shuts down the compressor 133 when the oxygen-ozone gas pressure in the high-pressure tank 137 reaches a level preset in the controller 151. The high-pressure oxygen-ozone gas flows out of the high-pressure tank 137 through piping 140 and 143 into the dissolved gas generator 147 to be dissolved into the water from the treating process.

The water is drawn from the treating system (not shown) through the water inlet 145 by pump 146. The water flows from pump 146 under pressure into the dissolved gas generator 147 and becomes saturated with dissolved oxygen and ozone. The water flowrate and volume is monitored by the flow sensor 144 and recorded by the controller 151.

The saturated water exits through outlet port 142 in the bottom of the dissolved gas generator 147, flows through piping 149 where the dissolving ozone concentration is monitored by sensor 150 and recorded by the controller 151, and exits the system through the water outlet 148. Excess oxygen not dissolved in fluid mixer 147 is returned to the low-pressure oxygen tank 131 through piping 141 and 129 to be recycled 100 percent oxygen usage.

When the controller 151 detects a drop in the concentration of the oxygen gas by sensor 127, the controller 151 switches the air control valve 117 to redirect the incoming airflow through media tank 109 and releases the pressure on media tank 106 and starts the vacuum pump 113 to dump the nitrogen adsorbed on the media 105 to the atmosphere. The vacuum pump 113 is operated for the length of time preset in the controller 151 and then shuts down.

From the water volume flowing through the dissolved gas supply system 100 and the amount of dissolved ozone in the water recorded in the controller 151, the controller 151 can also indicate the amount of dissolved ozone that is delivered to the treating process. The dissolved gas supply system 100 can also be sized by operating pressure and flowrate to deliver any quantity of dissolved ozone required by a treating process.

Figure 4:
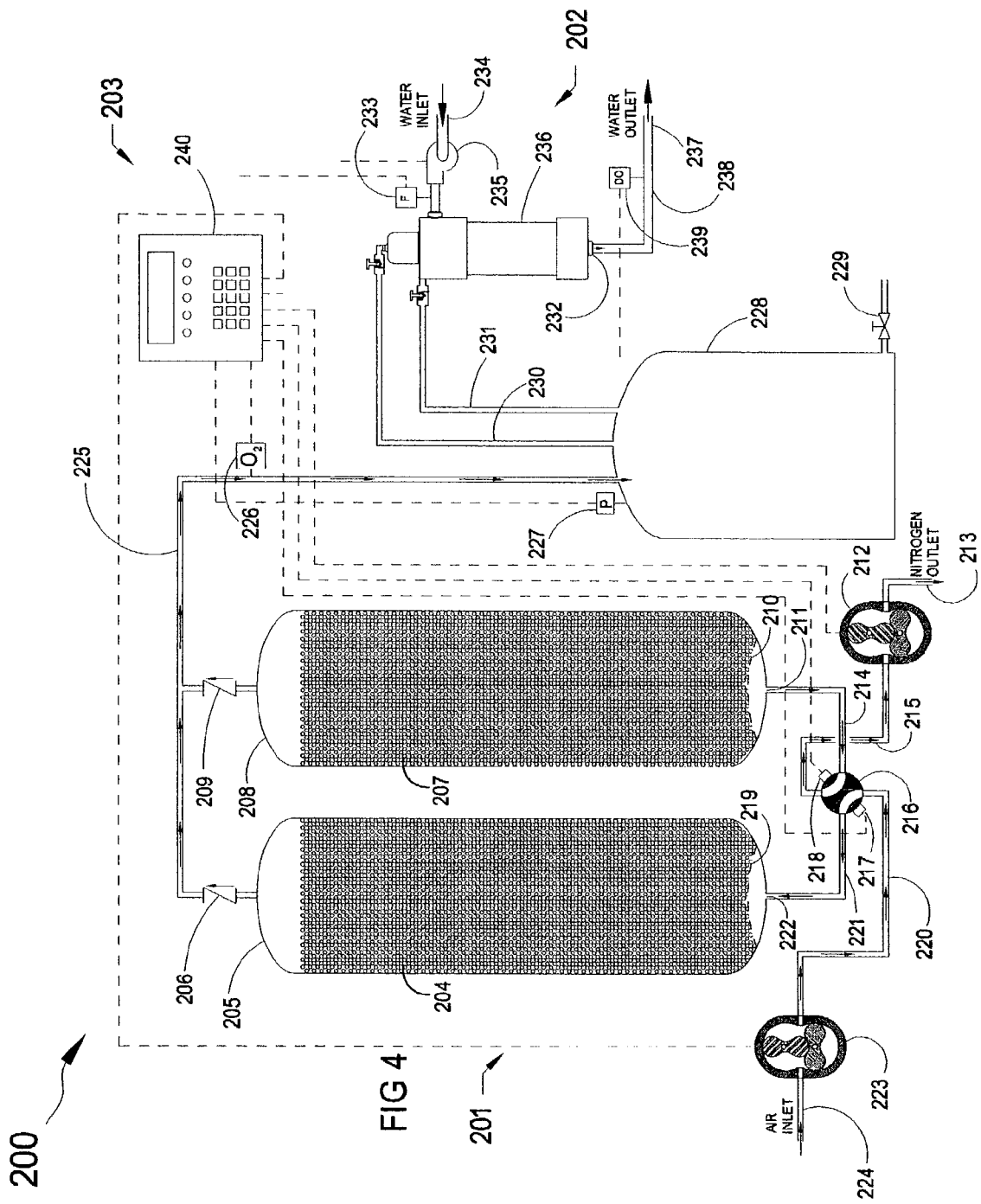
FIG. 4 depicts a schematic representation of a fourth embodiment of a dissolved gas supply system for supplying concentrated dissolved oxygen to biological and chemical water treating processes identifying major system components employing a vacuum pressure swing adsorption for extracting oxygen from atmospheric air as the source of oxygen and illustrating the flow pattern through the system where excess oxygen from the fluid mixer with a built in venturi is returned for reprocessing with 100 percent of the oxygen used for dissolving in a fluid mixer without discharging any to the atmosphere.

FIG. 4 depicts in a schematic illustration a fourth embodiment of an exemplary dissolved gas supply system 200 for supplying high concentrations of dissolved oxygen to biological and chemical oxidation-reduction processes employing a vacuum pressure swing adsorption (VPSA) system to concentrate oxygen from atmospheric air and a fluid mixer with built in venturi to draw in the oxygen without the use of a compressor in accordance with the present invention. The dissolved gas supply system 200 consists of a vacuum pressure swing adsorption (VPSA) system 201 to remove the nitrogen from the atmospheric air and furnish concentrated oxygen for dissolving into the water (or wastewater); an oxygen dissolving system 202 with a built in venturi suction to draw in and dissolve the oxygen into the water drawn from the water treating process; a control system 203 to monitor, time, and sequence system operation; and associated piping.

The vacuum pressure swing adsorption (VPSA) system 201 consists of two media tanks 205 and 208 containing molecular sieve media 204 and 207 respectively for separating nitrogen from air and allowing the oxygen to flow through, checkvalves 206 and 209 in the outlet of the media tanks 205 and 208 respectively, a four-way pilot operated air control valve 216 to alternate the media tank operation, a low pressure blower 223 or air pump to draw air from the atmosphere and drive it through the media tanks 205 and 208, a vacuum pump 212 to create a vacuum in the media tanks 205 and 208 and draw the nitrogen from the media 204 and 207 and discharge it to the atmosphere, and associated piping.

The oxygen that is allowed to flow through the media 204 and 207 may be from 90 percent pure and upward for non-human applications to virtually 100 percent for medical applications. The purity depends on the media and the processing it is subjected to during manufacturing. The oxygen dissolving system 202 consists of pump 235 to draw water from the treating process (not shown) and a fluid mixer with a built in venturi suction to draw the oxygen into the mixer applied as a dissolved gas generator 236 to dissolve the oxygen into the water. The fluid mixer applied as a dissolved gas generator 236 is further described in a following discussion of the drawings in FIGS. 9–11.

The control system 203 consists of a microprocessor controller 240, an oxygen pressure sensor 227, an oxygen gas concentration sensor 226, a water flow sensor 233, and a dissolved oxygen sensor 239. In operation, the blower 223 draws atmospheric air into the system through air inlet 224 where its pressure is increased to the level (typically below 20 psig) required to flow through the media 204 and 207 and overcome system pressure drops.

The air flows from the blower 223 through piping 220, through the air control valve 216 and is directed through piping 221 into the media tank 205 through the bottom inlet port 222. The pressurized air entering media tank 205 through the inlet 222 flows up through a bottom distributor 219 and up through the media 204 in media tank 205 where the nitrogen is adsorbed onto the media 204.

The oxygen gas exits the media tank 205 through checkvalve 206 and flows through piping 225 where the level of the oxygen gas concentration is monitored by an oxygen gas sensor 226 and recorded by the controller 240. The oxygen gas flows from piping 225 into the low-pressure tank 228 where the pressure is monitored by pressure sensor 227 and recorded by the controller 240.

The controller shuts down the blower 223 when the air pressure in the low-pressure tank 228 reaches a level preset in the controller 240. The low-pressure oxygen in drawn out of the low-pressure tank 228 and flows through piping 231 into the dissolved gas generator 236 to be dissolved into the water from the treating process.

The water is drawn from the treating system (not shown) through the water inlet 234 by pump 235. The water flows from pump 235 under pressure into the dissolved gas generator 236 and becomes saturated with dissolved oxygen. The water flowrate and volume is monitored by the flow sensor 233 and recorded by the controller 240. The saturated water exits through outlet port 232 in the bottom of the dissolved gas generator 236, flows through piping 238 where the dissolving oxygen concentration is monitored by sensor 239 and recorded by the controller 240, and exits the system through the water outlet 237.

When the controller 240 detects a drop in the concentration of the oxygen gas by sensor 226, the controller 240 switches the air control valve 216 to redirect the incoming airflow through media tank 208 and releases the pressure on media tank 205 and starts the vacuum pump 212 to dump the nitrogen adsorbed on the media 204 to the atmosphere.

The vacuum pump is operated for the length of time preset in the controller 240 and then shuts down. From the water volume flowing through the dissolved oxygen system and the amount of dissolved oxygen in the water recorded in the controller 240, the controller 240 can also indicate the amount of dissolved oxygen delivered to the treating process. The dissolved gas supply system 200 can also be sized to deliver any quantity of dissolved oxygen required by a treating process.

Figure 5:
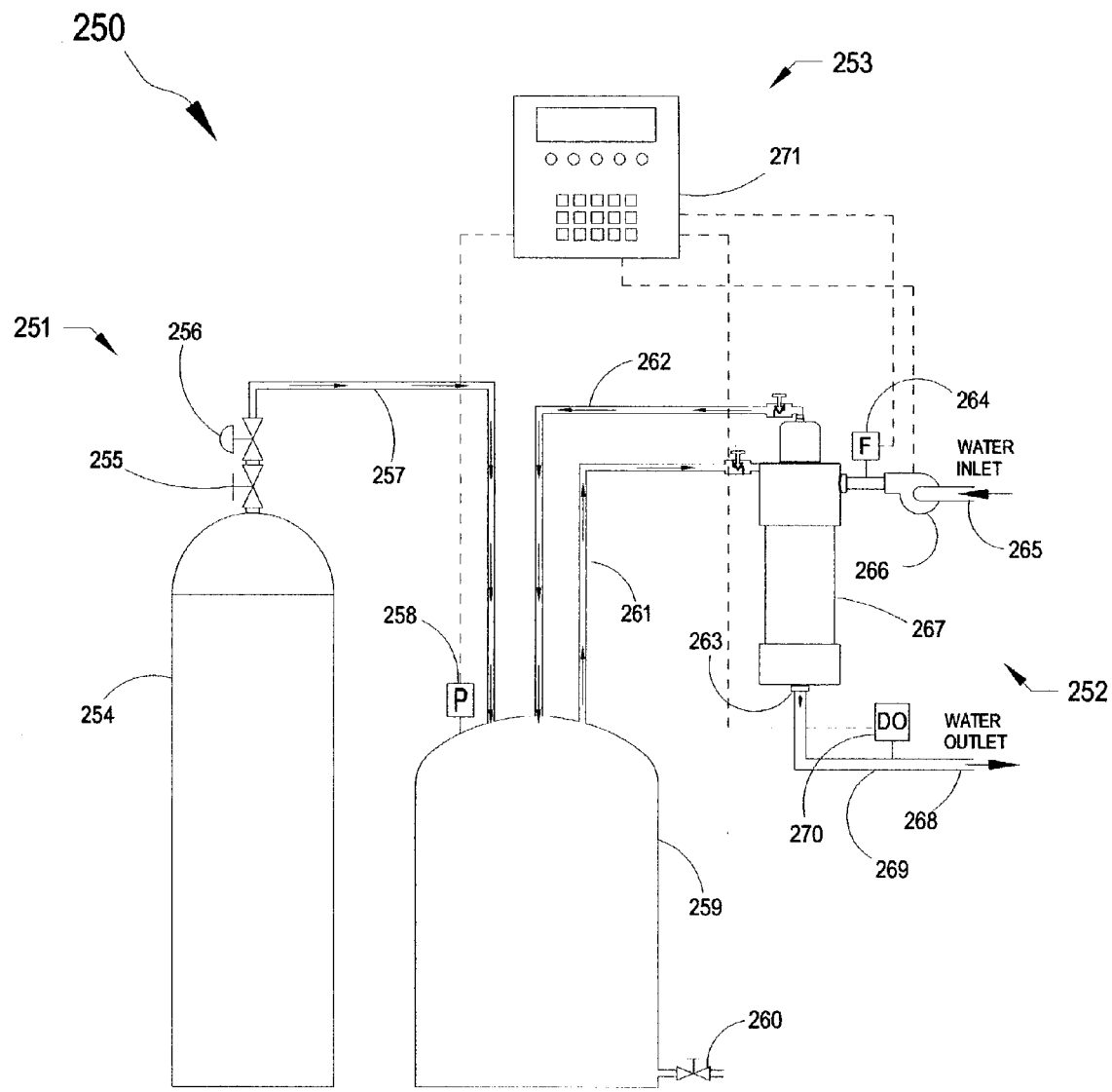
FIG. 5 depicts a schematic representation of a fifth embodiment of a dissolved gas supply system for supplying concentrated dissolved oxygen to biological and chemical water treating processes identifying major system components employing a pressurized oxygen tank as the source of pure oxygen and illustrating the flow pattern through the system where excess oxygen from the fluid mixer with a built in venturi is returned for reprocessing with 100 percent of the oxygen used for dissolving in a fluid mixer without discharging any to the atmosphere.

FIG. 5 depicts in a schematic illustration a fifth embodiment of an exemplary dissolved gas supply system 250 for supplying high concentrations of dissolved oxygen to biological and chemical oxidation-reduction processes employing a high pressure tank as a source of oxygen (or chlorine) and a fluid mixer with built in venturi to draw in the oxygen without the use of a compressor in accordance with the present invention. The dissolved gas supply system 250 consists of an oxygen supply system 251 to furnish concentrated oxygen for dissolving into the water (or wastewater); an oxygen dissolving system 252 to draw in and dissolve the oxygen into the water drawn from the water treating process; a control system 253 to monitor, time, and sequence system operation; and associated piping.

The oxygen supply system 251 consists of a pressurized oxygen supply tank 254, a shutoff valve 255, a pressure regulator 256, a low-pressure tank 259, and associated piping. The high-pressure tank 254 is a common method of supplying chlorine gas for application to water treatment.

The oxygen dissolving system 252 consists of pump 266 to create suction and draw water from the treating process (not shown) and a fluid mixer with venturi to draw the oxygen into the mixer applied as a dissolved gas generator 267 to dissolve the oxygen into the water. The fluid mixer applied as a dissolved gas generator 267 is further described in a following discussion of the drawings in FIGS. 9–11.

The control system 253 consists of a microprocessor controller 271, an oxygen pressure sensor 258, a water flow sensor 264, and a dissolved oxygen sensor 270. In operation, oxygen gas flows from the supply tank 254 through shutoff valve 255, pressure regulator 256, piping 257, and into the low-pressure tank 259 where the pressure is monitored by pressure sensor 258 and recorded by the controller 271.

The low-pressure oxygen is drawn out of the low-pressure tank 259 and flows through piping 261 into the dissolved gas generator 267 to be dissolved into the water from the treating process. The water is drawn from the treating system (not shown) through the water inlet 265 by pump 266. The water flows from pump 266 under pressure into the dissolved gas generator 267 and becomes saturated with dissolved oxygen. The water flowrate and volume is monitored by the flow sensor 264 and recorded by the controller 271. The saturated water exits through outlet port 263 in the bottom of the dissolved gas generator 267, flows through piping 269 where the dissolving oxygen concentration is monitored by sensor 270 and recorded by the controller 271, and exits the system through the water outlet 268. Excess oxygen not dissolved in the fluid mixer 267 is returned to the low-pressure tank 259 to be recycled for 100 percent oxygen usage. When the controller 271 detects a drop in the oxygen gas pressure by sensor 258, the controller 271 shuts the system down. From the water volume flowing through the dissolved oxygen system 250 and the amount of dissolved oxygen in the water recorded in the controller 271, the controller 271 can also indicate the amount of dissolved oxygen delivered to the treating process. The dissolved gas supply system 250 can also be sized by operating pressure and flowrate to deliver any quantity of dissolved oxygen required by a treating process.

The fluid mixers 39, 94, 147, 236, and 267 used as dissolved gas generators may correspond structurally and functionally to the radial-grooved ring mixer disclosed in co-pending patent application Ser. No. 09/879,496 filed Jun. 12, 2001, issued as U.S. Pat. No. 6,669,843 on Dec. 30, 2003, in the name of Johnny Arnaud and assigned to the same assignee as the present application. The fluid mixers applied as dissolved gas generators are shown in FIGS 1–5. While the radial-grooved ring mixers are described herein, the foregoing co-pending application is hereby incorporated herein by reference and can be referred to for further structural detail.

Figure 6:
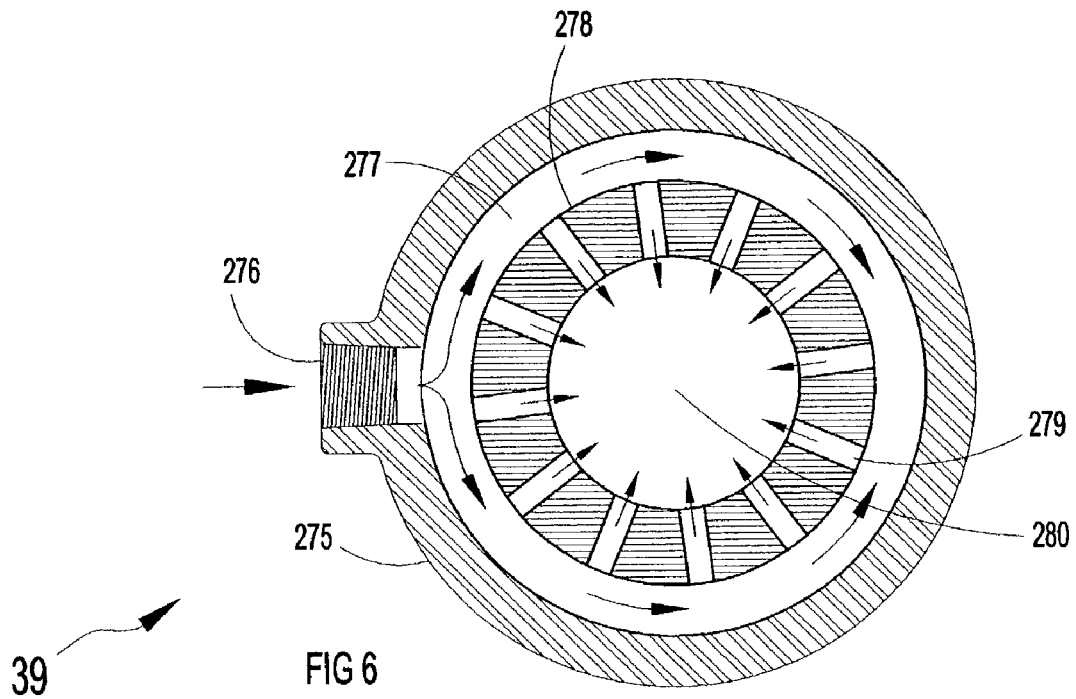
FIGS. 6–8 are fluid diagrams of a fluid mixer used as a dissolved gas generator employing a radial-grooved ring, an orifice ring positioned with the orifice ports over each groove in order to inject a gas into each stream, and an impact zone for saturating liquids with dissolved gases.
Figure 7:
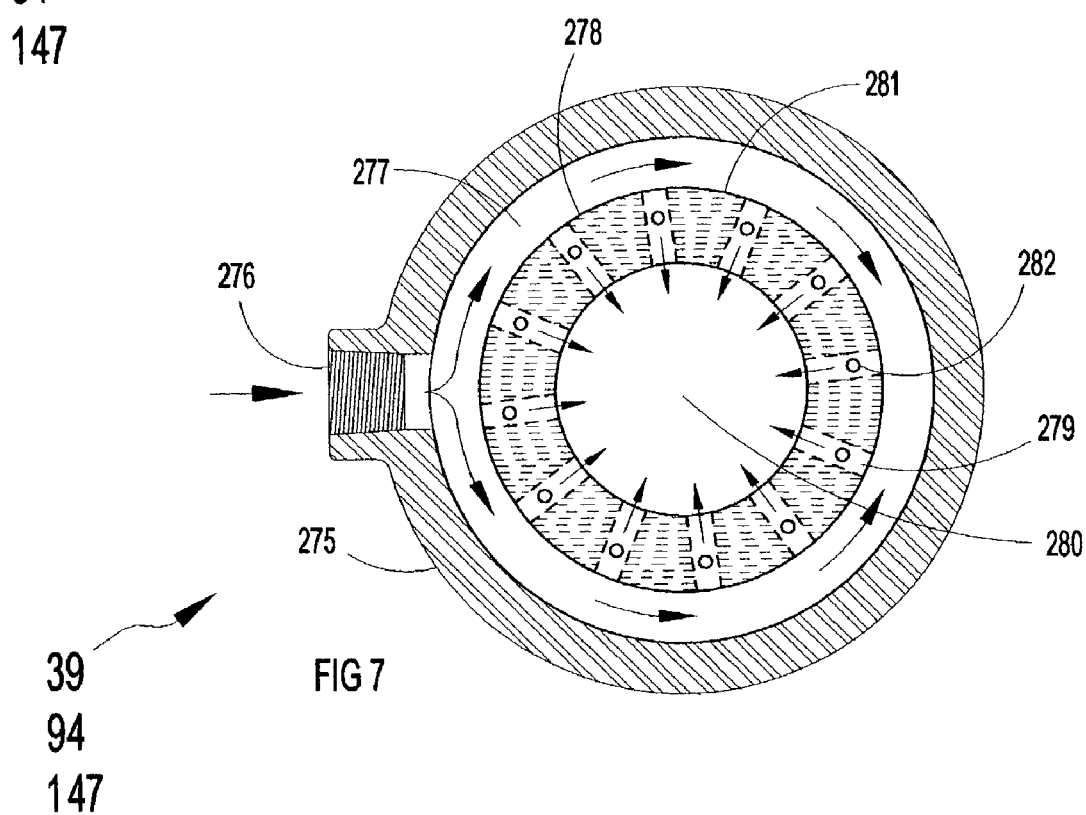
Figure 8:
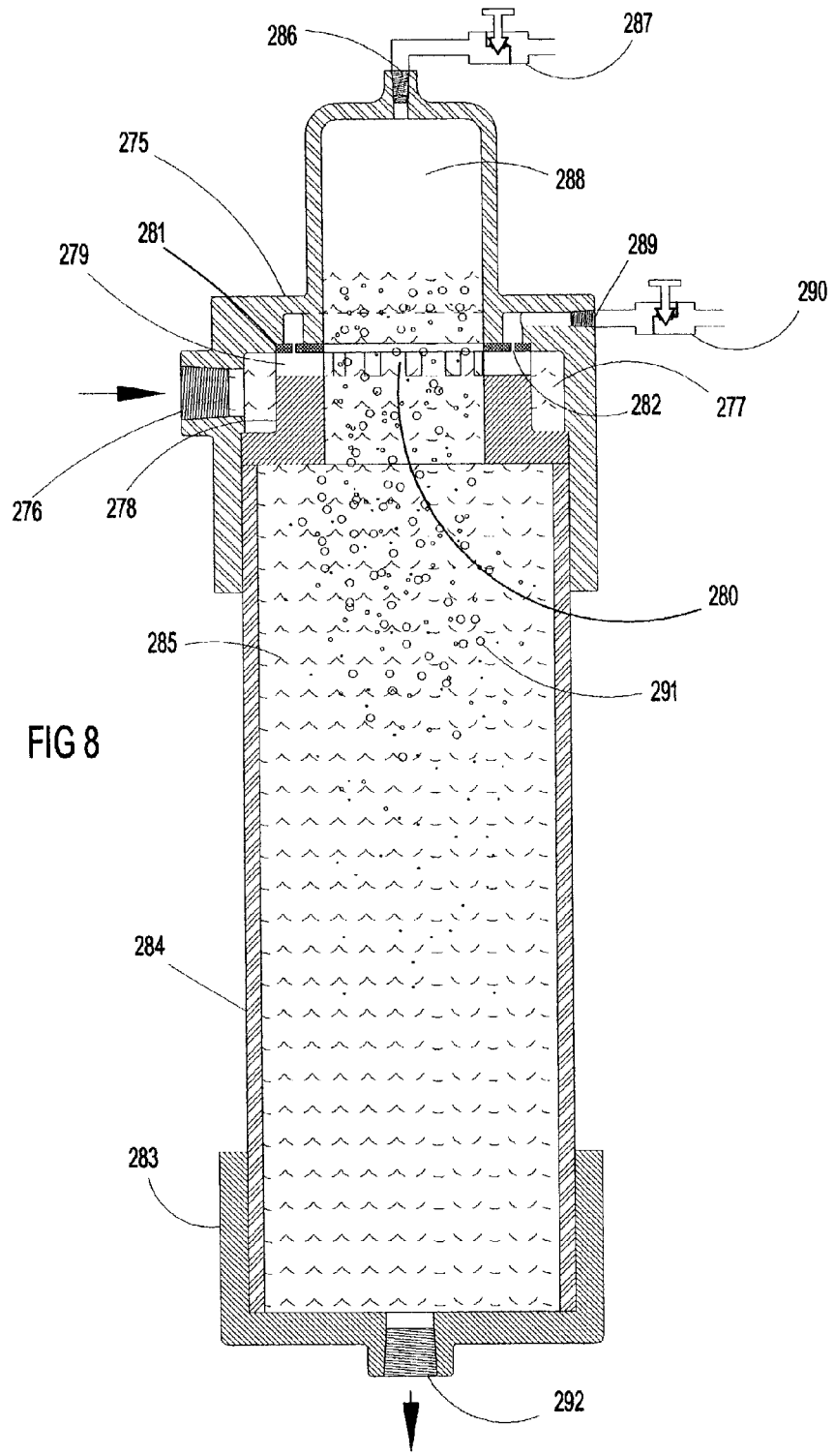

FIGS. 6–8 depict a fluid mixer of the dissolved gas generator 39, 94, or 147 employing the dynamic forces of fluid flow obtained with a radial-grooved ring where a high-pressure gas is to be dissolved into a liquid. FIG. 6 depicts a horizontal cross sectional view of the liquid inlet to the dissolved gas generator 39, 94, or 147 illustrating the donut housing 275 with the inlet 276, the distribution channel 277, the radial-grooved ring 278 with 8 radial grooves 279, and an impact chamber 280 or zone to which the radial grooves 279 are directed.

FIG. 7 also provides a horizontal cross sectional view of the dissolved gas generator 39, 94, or 147 with an orifice ring 281 positioned with the orifice ports 282 over the radial-grooves 279. The arrows indicate the direction of fluid flow. FIG. 8 provides a vertical cross sectional view of the fluid mixer 39, 94, or 147 assembly consisting of a cylindrical donut housing 275, an orifice ring 281, a radial-grooved ring 278, a lower cylinder 284, and a lower cap 283. The cylindrical donut housing 275 has a gas separation chamber 288 to separate excess gases from the liquids so the gases can be discharge while retaining the liquid.

The center of the radial-grooved ring 278 serves as an impact zone 280 into which the multiple streams of the liquid-gas mixture flowing at high velocity are directed to collide with each other. An inlet gas-metering valve 290 connected to the gas inlet 289 of the cylindrical donut housing 275 regulates the amount of gas supplied during operation. An outlet gas-metering valve 287 connected to the gas outlet 286 of the cylindrical donut housing 275 regulates the amount of gas discharged from the device during operation.

Referring to FIG. 7, the arrows indicate the direction of liquid flow. The liquid enters the fluid mixer 39, 94, or 147 through the inlet 276 and flows into the distribution channel 277 in both directions around the radial-grooved ring 278. The liquid is divided and flows into the radial grooves 279 under the orifice ring 281 where gas is injected into each of the high velocity streams. The liquid-gas mixture in each groove is then injected into the impact zone 280.

Referring to FIG. 8, again the liquid enters through inlet 276 and flows into the distribution channel 277 around the radial-grooved ring 278. The liquid then flows through the radial grooves 279 where gas is injected through the orifice ports 282 into each liquid stream. The liquid-gas mixture in each of the grooves 279 is then injected at high velocity into the impact zone 280 to collide with each other. The liquid becomes saturated with gas at this point.

The inlet gas-metering valve 290 regulates the amount of gas supplied. The saturated liquid 285 flows downward out of the impact zone 280 and into the larger area of the lower cylinder 284 where the velocity is decreased. The excess gas bubbles 291 flow upward and return to the impact zone 280. The saturated liquid 285 continues to flow downward and exits through the outlet 292. The excess bubbles flow up through the impact zone 280, and the gas is separated from the liquid in the separation chamber 288 and released from the unit through the outlet gas-metering valve 287.

The amount of gas retained in the separation chamber 288 regulates the liquid level in the apparatus. The amount of gas released is adjusted to maintain the liquid level just above the impact zone 280, and only a small amount of gas has to be released from the chamber 288. The fluid mixer 39, 94, or 147 is extremely effective at saturating liquid with gas with only five parts that can be manufactured in many sizes at low cost. It can be manufactured in metal or in plastic either machined or injection molded.

Figure 9:
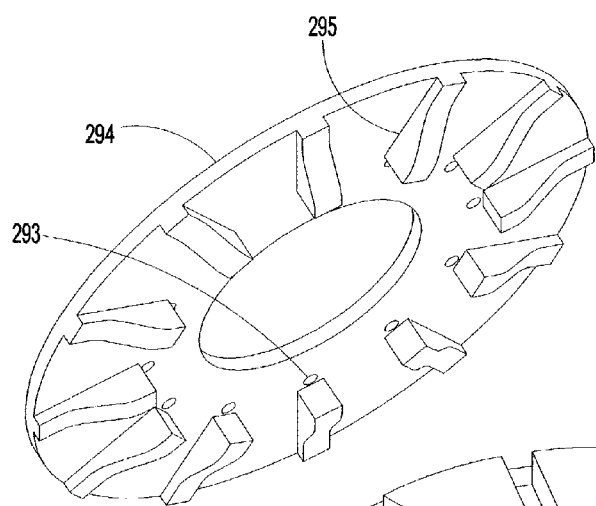
FIGS. 9 and 10 provide three-dimensional illustrations of a typical radial-grooved grooved ring and a combination venturi-orifice ring used in the fluid mixer.
Figure 10:
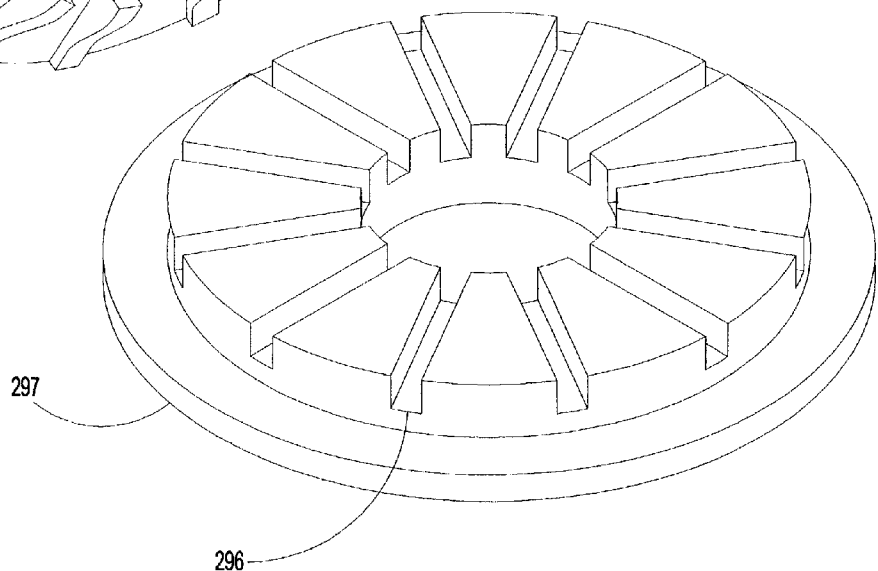
Figure 11:
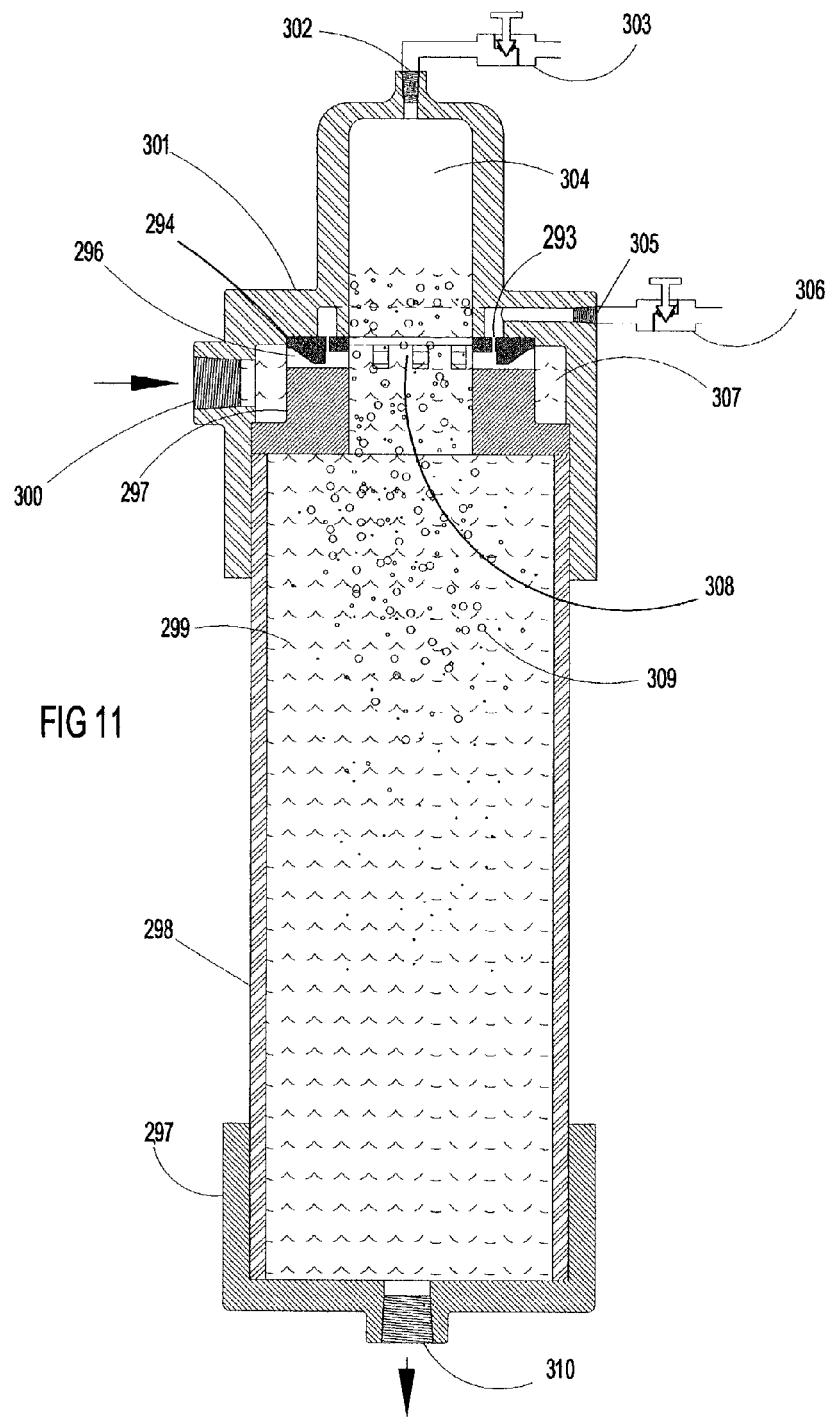
FIG. 11 is a fluid diagram of fluid mixer employing a radial-grooved ring; a combination venturi-orifice ring positioned with the venturi and orifice ports in each groove in order to draw a second fluid into each stream, and an impact zone for mixing in various fluids.

FIGS. 9–11 depict a fluid mixer applied as a dissolved gas generator 236 or 267 employing dynamic forces of fluid flow obtained with a radial-grooved ring where atmospheric air or some other low pressure gas to be dissolved into a liquid is drawn into the mixer by venturi suction built into the mixer. FIGS. 9 and 10 provide three-dimensional illustrations of a typical radial-grooved ring 297 and a combination venturi-orifice ring 294 having 12 orifices 293 and 12 venturi 295 to fit into the radial grooves 296 of the radial-grooved ring 297. FIG. 11 provides a vertical cross-sectional view of the fluid mixer 236 or 267 assembly consisting of a cylindrical donut housing 301, a combination venturi-orifice ring 294, a radial-grooved ring 297, a lower cylinder 298, and a lower cap 297.

The cylindrical donut housing 301 has a gas separation chamber 304 to separate excess gases from the liquids so the gases can by discharged while retaining the liquid. The center of the radial-grooved ring 297 serves as an impact zone 308 into which the multiple streams of the liquid-gas mixture flowing at high velocity are directed to collide with each other. An inlet gas-metering valve 306 connected to the gas inlet 305 of the cylindrical donut housing 301 regulates the amount of gas supplied during operation. An outlet gas-metering valve 303 connected to the gas outlet 302 of the cylindrical donut housing 301 regulates the amount of gas discharged from the device during operation.

Referring to FIG. 11, the liquid enters through inlet 300 and flows into the distribution channel 307 around the radial-grooved ring 297. The liquid then flows through the radial grooves 296 where gas is drawn through the orifice ports 293 into each liquid stream as the liquid flows by the venturi. The liquid-gas mixture in each of the grooves 296 is then injected at high velocity into the impact zone 308 to collide with each other. The liquid becomes saturated with gas at this point. The inlet gas-metering valve 306 regulates the amount of gas supplied. The saturated liquid 299 flows downward out of the impact zone 308 and into the larger area of the lower cylinder 298 where the velocity is decreased.

The excess gas bubbles 309 flow upward and return to the impact zone 308. The saturated liquid continues to flow downward and exits through the outlet 310. The excess bubbles flow up through the impact zone 308, and the gas is separated from the liquid in the separation chamber 304 and released from the unit through the outlet gas-metering valve 303. The amount of gas retained in the separation chamber 304 regulates the liquid level in the apparatus. The amount of gas released is adjusted to maintain the liquid level just above the impact zone 308, and only a small amount of gas has to be released from the chamber 304. The fluid mixer 236 or 267 is extremely effective at saturating liquids with gases with only five parts that can be manufactured in many sizes at low cost. It can be manufactured in metal or in plastic either machined or injection molded.

What is claimed:

1. A dissolved gas supply system comprising:
an air supply system adapted to pressurize air from the atmosphere;
a pressure swing adsorption system having a first container and a second container, each container containing molecular sieve media, the pressure swing adsorption system also having a control valve to alternate a flow of air into the first and second containers, and a flow of nitrogen adsorbed onto the media and out of the first and second containers, the air supply system providing pressurized air to the pressure swing adsorption system, concentrated oxygen exiting the pressure swing adsorption system;
a fluid mixing system adapted to draw water from a treating process, and to dissolve the concentrated oxygen from the pressure swing adsorption system into the water to saturation levels, excess oxygen from the fluid mixing system passing through an outlet;
an oxygen pressurization system adapted to pressurize the concentrated oxygen exiting the pressure swing adsorption system and to supply the pressurized oxygen to the fluid mixing system, the oxygen pressurization system having a low pressure tank to store the concentrated oxygen exiting the pressure swing adsorption system, a compressor to pressurize the oxygen, a high pressure tank to store the high-pressure oxygen, the high pressure oxygen being supplied to the fluid mixing system, the fluid mixing system further comprising a fluid mixer; and
a control system adapted to monitor the concentration of the oxygen exiting the pressure swing adsorption system, the control system adapted to selectively alternate the flow of pressurized air from the air supply system into the first container or the second container in response to a concentration of oxygen exiting the first and second containers.

2. The dissolved gas supply system of claim 1 in which excess oxygen from the fluid mixer outlet is returned to the low-pressure tank.

3. The dissolved gas supply system of claim 2 in which the control system includes an oxygen pressure sensor, the control system adapted to turn off the blower when the pressure in the low pressure tank measured by the oxygen pressure sensor reaches a predetermined level.

4. The dissolved gas supply system of claim 3 in which the control system includes a compressed oxygen pressure sensor, the control system adapted to turn off the compressor when the pressure in the high-pressure tank, as measured by the compressed oxygen pressure sensor, reaches a preset value.

5. The dissolved gas supply system of claim 4 wherein the fluid mixing system is an oxygen dissolving supply system to dissolve the oxygen into the water.

6. The dissolved gas supply system of claim 1, wherein the excess oxygen from the fluid mixing system passes through the outlet and is released to the atmosphere.

7. The dissolved gas supply system of claim 1 in which the first container is a first tank and the second container is a second tank.

8. The dissolved gas supply system of claim 7, in which the air supply system further comprises a compressor to compress the air and the pressure tank to store the pressurized air, the control system in communication with a sensor on the pressure tank adapted to shut down the compressor when the air pressure in the pressure tank reaches a predetermined value, as measured by the sensor on the pressure tank.

9. The dissolved gas supply system of claim 8, in which the control system operates such that when the molecular sieve media in the first tank is exhausted, the pressurized air is switched to flow trough the second tank by the control system, the pressure with the first tank being reduced to release the nitrogen from the media to the atmosphere.

10. The dissolved gas supply system of claim 9, in which molecular sieve media further comprises beads to selectively remove the nitrogen from the atmospheric air passing through each tank by adsorption.

11. The dissolved gas supply system of claim 10 wherein the control valve of the pressure swing adsorption system comprises a four way pressure valve.

12. The dissolved gas supply system of claim 11 in which the fluid mixing system further comprises a mixer.

13. The dissolved gas supply system of claim 1 in which the air supply system further comprises an air blower to increase the pressure of the air delivered to the pressure swing adsorption system.

14. The dissolved gas supply system of claim 13 further comprising a vacuum pump functionally associated with a lower end of each of the first and second tanks to create a vacuum in the first and second tanks when the molecular sieve media is exhausted to exhaust nitrogen to the atmosphere.

15. A dissolved gas supply system, comprising:

a vacuum pressure swing adsorption system having a first tank and a second tank, each tank containing molecular sieve media, the vacuum pressure swing adsorption system also having a control valve to alternate a flow of air into the first and second media tanks, and a flow of nitrogen adsorbed onto the media out of the first and second media tanks, a low pressure blower providing air to the vacuum pressure swing adsorption system;

an ozone dissolving system to dissolve ozone into water drawn from a water treating process;

an oxygen pressurization and ozone generation system to deliver concentrated oxygen from the vacuum pressure swing adsorption system and supply an oxygen-ozone gas mixture to the ozone dissolving system at a pressure required by the ozone dissolving system, the ozone generation system having a low-pressure tank to hold the concentrated oxygen exiting the vacuum pressure swing adsorption system, a compressor with a high-pressure tank to pressurize the concentrated oxygen from the low-pressure tank, an oxygen gas cooler to decrease the oxygen gas temperature, and an ozone generator to convert a portion of the concentrated oxygen to ozone for dissolving, in the ozone dissolving system; and a control system adapted to monitor the concentration of the oxygen exiting the vacuum pressure swing adsorption system, the control system adapted to selectively change the flow of air from the blower into the first tank or the second tank in response to a concentration of oxygen exiting the vacuum pressure swing adsorption system.

16. The dissolved gas supply system of claim 15 in which the ozone dissolving system further comprises a fluid mixer to mix the oxygen-ozone gas mixture from the ozone generation system with the water drawn from the water treating process, the fluid mixer returning excess ozone-oxygen gases in the mixer back to the low-pressure tank for recycling.

17. The dissolved gas supply system of claim 15 further comprising a vacuum pump to create a vacuum in the first and second tanks when the molecular sieve media is exhausted to exhaust nitrogen adsorbed onto the media to the atmosphere.

18. A dissolved gas supply system, comprising:

a vacuum pressure swing adsorption (VPSA) system having a first tank and a second tank, each rank containing molecular sieve media, the VPSA system having a control valve to alternate the flow of air into the first and second media tanks, and the a flow of nitrogen adsorbed onto the media out of the first and second media tanks, a low pressure blower providing air to the VPSA system;

a low-pressure tank to store the concentrated oxygen gas exiting the VPSA system;

a dissolved gas generator including a fluid mixer having a venturi for mixing the concentrated oxygen from the low-pressure tank with water to be treated; and a control system adapted to monitor the concentration of the oxygen exiting the VPSA system, the control system adapted to selective change the flow of air from the blower into the first tank or the second tank in response to a concentration of oxygen exiting the vacuum pressure swing adsorption system, in which the fluid mixer further comprises an upper cylindrical donut housing with a first fluid inlet in the upper housing, a radial grooved ring having a plurality of grooves,
the ring being concentric to the upper donut housing,
the ring having an outer diameter on a first end that is smaller than a diameter of the donut housing thus defining a distribution channel, a venturi orifice ring having orifices adapted to inject ozone into water leaving the grooves and a lower cylinder concentric with the ring and surrounded by the ring, the cylinder in fluid communication with the distribution channel via the grooves, a liquid outlet being located at a bottom of the cylinder.

19. The dissolved gas supply system of claim 18, in which the fluid mixer further comprises:

a gas inlet meter for regulating the amount of gas supplied at a gas inlet on the cylindrical donut housing; and a gas outlet meter at the gas outlet for regulating the amount of gas discharged from the mixer.

20. The dissolved gas supply system of claim 19 in which the fluid mixer comprises radial grooves.

21. The dissolved gas supply system of claim 18 wherein the control system includes an oxygen pressure sensor at the low pressure tank and shuts down the blower when the air pressure in the low pressure tank as measured by the oxygen pressure sensor reaches a first predetermined level.

22. The dissolved gas supply system of claim 21 further comprising a vacuum pump to create a vacuum in the first and second tanks when the molecular sieve media is exhausted to exhaust nitrogen adsorbed onto the media to the atmosphere.

23. A dissolved gas supply system, comprising:

an oxygen supply system having a pressurized oxygen supply tank:

a low-pressure tank for storing the oxygen from the supply tank, a valve being between the low-pressure tank and the oxygen supply tank;

a fluid mixer for mixing oxygen from the low-pressure tank and water circulated through the fluid mixer from a treating system; and a controller adapted to shut off the valve between the oxygen supply tank and the low-pressure tank when the pressure of the oxygen in the low pressure tank drops below a predetermined value, as measured by an oxygen pressure sensor thereon, wherein oxygen not dissolved in the fluid mixer is returned to the low-pressure tank, and wherein the fluid mixer comprises:

an upper cylindrical donut housing with a first fluid inlet in the upper housing;

a radial grooved ring having a plurality of grooves,
the ring being concentric to the upper donut housing,
the ring having an outer diameter on a first end that is smaller than a diameter of the donut housing thus defining a distribution channel;

a venturi orifice ring having orifices adapted to inject oxygen into water leaving the grooves; and a lower cylinder concentric with the ring and surrounded by the ring, the cylinder in fluid communication with the distribution channel via the grooves, a liquid outlet being located at a bottom of the cylinder.

24. The dissolved gas supply system of claim 23 in which the fluid mixer has radial grooves.

25. A dissolved gas supply system, comprising:

an air supply system adapted to pressurize air from the atmosphere;

a pressure swing adsorption system having a first container and a second container, each container containing molecular sieve media, the pressure swing adsorption system also having a control valve to alternate a flow of air into the first and second containers, and a flow of nitrogen adsorbed onto the media and out of the first and second containers, the air supply system providing pressurized air to the pressure swing adsorption system, concentrated oxygen exiting the pressure swing adsorption system;

a fluid mixing system adapted to draw water from a treating process, and to dissolve the concentrated oxygen from the pressure swing adsorption system into the water to saturation levels, excess oxygen from the fluid mixing system passing through an outlet; and a control system adapted to monitor the concentration of the oxygen exiting the pressure swing adsorption system, the control system adapted to selectively alternate the flow of pressurized air from the air supply system into the first container or the second container in response to a concentration of oxygen exiting the first and second containers, in which the fluid mixing system includes a fluid mixer having an upper housing having a cylindrical donut with a fluid inlet, the upper housing having a gas separation chamber to separate excess gases such as oxygen from liquids such as water for discharging oxygen through a gas outlet on the upper housing;

a ring having a plurality of grooves, the ring being concentric to the cylindrical donut housing, the ring having an outer diameter on a first end that is smaller than a diameter of the cylindrical donut housing, thus defining a distribution channel;

an orifice ring adapted to inject oxygen in water leaving the grooves; and a cylinder concentric with the ring and surrounded by the ring, the cylinder in fluid communication with the distribution channel via the grooves, a saturated liquid outlet being located at a bottom of the cylinder.

26. The dissolved gas supply system of claim 25 in which the fluid mixer further comprises grooves which are radial.

* * * * *